United States Patent [19]

Krishnan et al.

[11] Patent Number: 5,087,524

[45] Date of Patent: Feb. 11, 1992

[54] ARTICLE MOLDED FROM A POLYCARBONATE COMPOSITION HAVING IMPROVED PLATABILITY

[75] Inventors: Sivaram Krishnan, Pittsburgh, Pa.; Ronald L. Price, Weirton, W. Va.; Peter H. C. Shu, Upper St. Clair, Pa.; Mark W. Witman, Naperville, Ill.

[73] Assignee: Mobay Corporation, Pittsburgh, Pa.

[21] Appl. No.: 519,036

[22] Filed: May 4, 1990

Related U.S. Application Data

[63] Continuation-in-part of Ser. No. 247,975, Sep. 22, 1988, abandoned.

[51] Int. Cl.$^5$ .................. C08L 69/00; B32B 15/08
[52] U.S. Cl. ..................... 428/412; 525/146; 525/148; 525/468; 524/109; 524/112
[58] Field of Search .................. 428/412; 525/67, 148, 525/468; 524/109, 112

[56] References Cited

U.S. PATENT DOCUMENTS

| | | | |
|---|---|---|---|
| 3,130,177 | 4/1964 | Grabowski | 260/45.5 |
| 3,162,695 | 12/1964 | Grabowski | 260/873 |
| 3,663,471 | 5/1972 | Schirmer et al. | 260/40 |
| 3,852,393 | 12/1974 | Furukawa et al. | 260/873 |
| 3,862,998 | 1/1975 | Koehler | 525/468 |
| 3,880,783 | 4/1975 | Serini et al. | 260/3 |
| 3,951,903 | 4/1976 | Shaffer | 260/37 |
| 3,966,842 | 6/1976 | Ludwig et al. | 260/873 |
| 4,122,130 | 10/1978 | Fava | 260/873 |
| 4,125,649 | 11/1978 | Donovan et al. | 427/307 |
| 4,172,103 | 10/1979 | Serini et al. | 525/76 |
| 4,204,047 | 5/1980 | Margotte et al. | 525/67 |
| 4,205,141 | 5/1980 | Liebig et al. | 525/67 |
| 4,410,662 | 10/1983 | Witman | 525/468 |
| 4,420,584 | 12/1983 | Rawlings et al. | 524/502 |
| 4,487,881 | 12/1984 | Rawlings et al. | 524/504 |
| 4,665,125 | 5/1987 | Kishida et al. | 525/67 |
| 4,755,559 | 7/1988 | Kishida | 525/67 |
| 4,828,921 | 5/1989 | Witman | 525/67 |

FOREIGN PATENT DOCUMENTS

| | | |
|---|---|---|
| 56-14549 | 4/1981 | Japan . |
| 58-196238 | 11/1983 | Japan . |
| 60-230985 | 4/1986 | Japan . |
| 1274217 | 7/1969 | United Kingdom . |
| 1253226 | 11/1971 | United Kingdom . |
| 2143242 | 12/1988 | United Kingdom . |
| 2196341 | 9/1989 | United Kingdom . |

OTHER PUBLICATIONS

Chemical Abstracts, vol. 79, No. 20, 19th Nov., 1973, p. 19, abstract no. 116138m, Columbus, Ohio.

*Primary Examiner*—Melvyn I. Marquis
*Assistant Examiner*—David Buttner
*Attorney, Agent, or Firm*—Joseph C. Gil; Aron Preis

[57] ABSTRACT

A molding composition comprising a polycarbonate resin and plating modifier was found to be suitable for preparing metal coated articles where the metal coating is deposited by an electroless process. The plating modifier in accordance with the invention is at least one member selected from the group consisting of a polyanhydride, and a monovinyl aromatic-acrylonitrile copolymer. An advantageous embodiment of the invention includes incorporating in the molding composition a flame retarding amount of a conventional flame retarding agent for polycarbonate compositions.

2 Claims, No Drawings

ARTICLE MOLDED FROM A POLYCARBONATE COMPOSITION HAVING IMPROVED PLATABILITY

CROSS-REFERENCE TO RELATED APPLICATION

This application is a continuation-in-part of U.S. application Ser. No. 07/247,975, filed on Sept. 22, 1988, now abandoned.

FIELD OF THE INVENTION

The invention is directed to articles molded from polycarbonate molding compositions and more particularly to molded articles having a metal coating deposited thereon by an electroless plating process.

SUMMARY OF THE INVENTION

A molding composition comprising a polycarbonate resin and plating modifier was found to be suitable for preparing metal coated articles where the metal coating is deposited by an electroless plating process. The plating modifier in accordance with the invention is at least one member selected from the group consisting of a polyanhydride and a monovinyl aromatic-acrylonitrile copolymer. An advantageous embodiment of the invention includes incorporating in the molding composition a flame retarding amount of a conventional flame retarding agent for polycarbonate compositions.

BACKGROUND OF THE INVENTION

Electroless plating of articles molded from polycarbonate resins are used in the manufacture of EMI shielded articles. Processes for electroless plating have been disclosed in U.S. Pat. No. 4,125,649 and in the Encyclopedia of Polymer Science and Technology, Vol. 8 among others.

Blends of ABS and polycarbonate resins were disclosed in U.S. Pat. Nos. 3,130,177 and 3,852,393 to have improved impact resistance. Similar blends are disclosed in British Patent No. 1,253,226 whereas U.S. Pat. No. 3,162,695 is noted for its teaching respecting a blend of polycarbonate and a graft copolymer of methylmethacrylate and styrene monomers polymerized in the presence of a butadiene styrene latex. Copolymers of maleic anhydride and α-olefin were disclosed as impact modifiers of glass reinforced polycarbonates in U.S. Pat. No. 4,420,584. The art is further noted to include U.S. Pat. No. 3,966,842 which is directed to compositions comprising polycarbonate and a diene rubber-containing styrene/maleic anhydride.

Also of interest are U.S. Pat. Nos. 4,172,103 and 3,880,783, both describing mixtures of special polycarbonates with other thermoplastic resins including copolymers of maleic anhydride. Also, U.S. Pat. No. 4,205,141, discloses mixtures of polycarbonates with copolymers from styrene acrylonitrile and maleic anhydride, U.S. Pat. No. 4,204,047 discloses mixtures of polycarbonates with ABS which may optionally contain an N-substituted maleimide, U.S. Pat. No. 3,951,903 describes the addition to polycarbonate resin of acid anhydrides and U.S. Pat. No. 4,122,130, which discloses a blend of polycarbonate and the imido derivative of rubber-modified styrene, maleic anhydride.

U.S. Pat. No. 4,487,881 is noted to disclose a molding composition comprising a blend of a polycarbonate resin, a graft elastomer and a polyanhydride. The composition is said to have an improved level of impact performance.

DETAILED DESCRIPTION OF THE INVENTION

The Polycarbonate Resin

The polycarbonate resins useful in the practice of the invention are homopolycarbonates, copolycarbonates and terpolycarbonates or mixtures thereof. The polycarbonates generally have a molecular weight of 10,000–200,000 (weight average molecular weight), preferably 20,000–80,000 and their melt flow rate, per ASTM D-1238 at 300° C., is about 1 to about 60 gm/10 min. They may be prepared, for example, by the known interfacial process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, 1964, all incorporated herein by reference).

In the present context, dihydroxy compounds suitable for the preparation of the polycarbonates of the invention conform to the structural formulae (1) or (2)

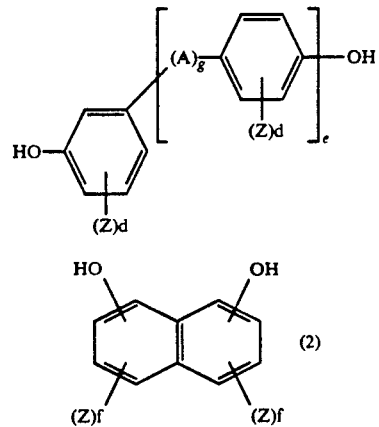

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

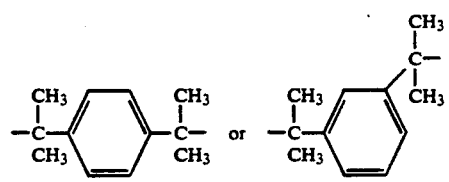

e and g both denote the number 0 to 1;
Z denotes F, Cl, Br or C$_1$–C$_4$-alkyl and if several Z radicals are substituents in one aryl radical, they may be identical or different;
d denotes 0 or an integer of from 1 to 4; and
f denotes 0 or an integer of from 1 to 3.

Among the useful bisphenols in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones and α,α'-bis-(hydroxyphenyl)diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mole % (relative to the bisphenols) of polyhydroxyl compounds. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)heptane; 1,3,5-tri-(4-hydroxyphenyl)benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl]-propane; 2,4-bis-(4-hydroxy-1-isopropylidine)-phenol; 2,6-bis-(2'-dihydroxy-5'-methylbenzyl)-4-methylphenol; 2,4-dihydroxybenzoic acid; 2-(4-hydroxyphenyl)-2-(2,4-dihydroxyphenyl)propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, under the trademark Makrolon from Mobay Corporation, Pittsburgh, Penn. Particularly suitable are bisphenol A based homopolycarbonate resins having melt indices per ASTM D-1238 in the ranges of 3.5–60 gm/10 min.

The plating modifier in accordance with the invention is at least one member selected from the group consisting of a polyanhydride, and a monovinyl aromatic-acrylonitrile copolymer. In the present context, polyanhydride conforms to

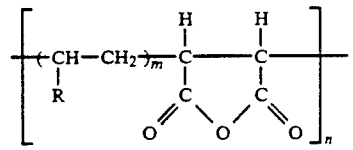

wherein R is a hydrogen atom or a $C_1$–$C_{28}$ alkyl, aryl or alkylaryl radical, n is an integer of from 1 to 200 and m is an integer of from 1 to 3.

Preferably R is either a hydrogen atom or a $C_{14}$–$C_{16}$ alkyl group.

Preparation of suitable polyanhydrides was disclosed in U.S. Pat. No. 3,586,659 which is incorporated herein by reference. Commercial products suitable in the practice are EMA resins from Monsanto and polyanhydrides from Gulf Oil Chemical Company.

The monovinyl aromatic-acrylonitrile copolymer herein SAN copolymer, is well known and is available commercially. The monovinyl aromatic monomers utilized are generically described by the formula:

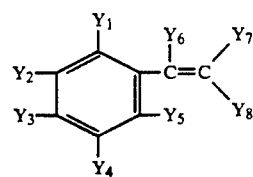

wherein $Y_1$–$Y_8$ independently are selected from the group consisting of hydrogen, alkyl groups containing from 1 to 5 carbon atoms, chloro and bromo. Examples of the monovinyl aromatic compounds and substituted monovinyl aromatic compounds that may be used are styrene and other vinyl-substituted aromatic compounds including alkyl-, cycloalkyl-, aryl, alkaryl-, aralkyl-, alkoxy-, arloxy- and other substituted vinyl aromatic compounds. Examples of such compounds are 3-methylstyrene, 3,5-diethylstyrene and 4-n-propylstyrene, alpha-chlorostyrene, vinyl toluene, α-bromostyrene, chlorophenylethylenes, dibromophenylethylenes, tetrachlorophenylethylenes, 1-vinylnaphthalene, 2-vinyl-naphthalene, mixtures thereof and the like. The preferred monovinyl aromatic hydrocarbon used herein is styrene.

The second group of monomers are acrylonitrile and/or substituted acrylonitrile. The acrylonitrile and substituted acrylonitrile are described generically by the formula

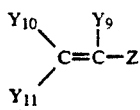

wherein $Y_9$–$Y_{11}$ independently are selected from the group consisting of hydrogen, alkyl groups containing from 1 to 5 carbon atoms, chloro and bromo and Z is selected from the group consisting of cyano and carbalkoxy wherein the alkyl group of the carbalkoxy group contains from 1 to about 12 carbon atoms. Examples are acrylonitrile, alpha-chloroacrylonitrile, beta-chloroacrylonitrile, alpha-bromoacrylonitrile and beta-bromoacrylonitrile. The preferred acrylic monomer used herein is acrylonitrile.

In the practice of the invention, a thermoplastic molding composition is prepared by blending a polycarbonate resin with said percents being relative to the total weight of the resin and modifier. 0.5 to 5 percent, preferably 0.5 to 2 percent of polyanhydride or 0.8 to 5%, preferably 1 to 2% of SAN.

The compositions of the invention may further contain auxiliary additives such as flame retarding agents, pigments, stabilizers, release agents, fillers and reinforcing agents all of which are conventional and known in the art.

Flame retardant agents for polycarbonate resins are known in the art. These agents have been widely reported in the patent literature and include halogenated compounds, especially brominated compounds and most particularly aromatic brominated compounds, sulfonate salts of alkali metals or alkaline earth metals and complex ion metal salts, such as sodium aluminum fluoride, and phosphorus compounds. The relevant literature includes U.S. Pat. No. 3,823,175 relating to halogenated neopentyl chloroformates, U.S. Pat. No. 4,195,156 entailing disulfonic acid salts and U.S. Pat. No. 4,269,762 relating to tetrahydrocarbyl borate salts. Also relevant are U.S. Pat. Nos. 3,027,349 (phosphate polymers), 3,475,372 (metal salts of mercaptobenzotriazoles), 3,509,090 (halogenated organosilicones), 3,535,300 (organo metal salts), 3,557,053 (tris-halophenyl phosphates), 3,597,390 (tris-halophenyl phosphonites), 3,775,367 (perfluorosulfonate salts), 3,836,490 (alkali metal salts), 3,875,107 (alkali metal salts), 4,017,457 (ferrocene), 4,098,754 (alkali metal organic salts), 4,100,130 (sulfur), 4,174,359 (oligomeric tetrabromo polycarbonate and sulfonate salts), 4,223,100 (alkali metal salts, PTFE and an aromatically bound bromine) as well as U.S. Pat. Nos. 3,382,207 (decabromodiphenyl carbonate), 3,647,747 (barium carbonate), 3,651,174 (BaCO$_3$, organosiloxane and PTFE), 3,796,772 (titanates), 3,867,336 (an aryloxy substituted polyhalogenated aromatic compound); U.S. Pat. Nos. 3,931,100, 3,940,366, 3,951,910, 3,953,396, 3,978,024, 4,001,175, 4,007,155, 4,032,506, 4,033,930, 4,039,509, 4,064,101, 4,067,846, 4,073,768, 4,075,164, 4,093,590, 4,093,589, 4,104,245, 4,104,246, 4,115,354, 4,153,595, 4,201,832, 4,263,201, 4,268,429, 3,909,490, 3,917,559, 3,919,167 (sulfonic acid salts), 3,933,734 (sulfonates), 3,948,851, 4,092,291 (sulfone-sulfonic salts), 3,953,399 (carboxylic acid esters), 3,971,756 (alkali metal salts and siloxanes), 4,028,297 (salts of inorganic sulfur oxyacids), 4,066,618 (metal salts of halogenated nonaromatic carboxylic acid), 4,069,201, 4,111,977 (unsubstituted or halogenated oxycarbon acids), 4,104,253, 4,113,695 (halogenated organic metal salts), 4,209,427 (formaldehydes), 4,220,583 (partially fluorinated olefins), 4,235,978 (organopolysiloxanes), 4,241,434 (alkali or alkaline earth metal salts), 4,254,252 (cyclic polyformates), the disclosures of each of the above patents is incorporated herein by reference. Preferably the flame retarding agents are sulfonate salts and halogenated aromatic compounds.

The invention is illustrated below but is not intended to be limited by the examples in which all parts and percentages are by weight unless otherwise specified.

EXAMPLES

Compositions within the scope of the invention were prepared and test specimens molded therefrom. The preparation and molding steps followed conventional procedures and used known equipment. In the examples, the resin was a bisphenol A based polycarbonate. A flame retarding agent, potassium perfluorobutane sulfonate at a level of 0.1 percent was included in the compositions. About 1.6% of a pigment and mold release agent having no present criticality were also included.

The molded specimens were coated with a thin layer of copper deposited by an electroless process. The table below summarizes the results of the evaluation of the compositions.

Example 1 (control) contained no plating modifier while Examples 2 and 3 contained respectively 0.5 and 1.0 percent of polyanhydride (EMA 1103 from Monsanto).

| EXAMPLE | 1 | 2 | 3 |
| --- | --- | --- | --- |
| Polycarbonate, % | 98.3 | 98.3 | 97.3 |
| Flame retarding agent, % | 0.10 | 0.10 | 0.10 |
| Plating Modifier, % | — | 0.5 | 1.0 |
| Pigment and Release Agent | 1.6 | 1.6 | 1.6 |
| Melt flow gms/10 min. | 17.9 | 15.8 | 16.5 |
| Flammability rating. | | | |
| UL-94 (@ ⅛") as is | V-2 | V-0 | V-0 |
| after 7 days aging | V-0 | V-0 | V-0 |
| Adhesion force lbs/in | | | |
| (range) | 2.7–5.0 | 2.5–6.2 | 4.2–7.9 |
| (average) | 3.7 | 4.9 | 5.6 |

In Examples 4 and 5 the plating modifier was a copolymer of styrene and acrylonitrile (28% Acrylonitrile - 72% styrene).

| EXAMPLE | 4 | 5 |
| --- | --- | --- |
| Polycarbonate, % | 98.3 | 97.3 |
| Flame retarding agent, % | 0.10 | 0.10 |
| Plating Modifier, % | 0.50 | 1.00 |
| Pigment and Release Agent | 1.6 | 1.6 |
| Melt flow gms/10 min. | 14.7 | 14.5 |
| Flammability rating. | | |
| UL-94 (@ ⅛") as is | V-0 | V-0 |
| after 7 days aging | V-0 | V-0 |
| Adhesion force lbs/in | | |
| (range) | 1.3–3.8 | 2.3–8.2 |
| (average) | 2.6 | 5.2 |

In the experiments, a 6"×6" plate was molded from each of the compositions and a thin layer of Cu/Ni was deposited on each by an electroless plating process. The adhesion of the metallic layer to the substrate was determined by a test in accordance with ASTM B-533.

The invention is characterized in that the composition contains no conjugated diene and in that the copolymer contains no basic nitrogen atoms.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An article molded from a thermoplastic molding composition comprising an aromatic polycarbonate resin and about 0.5 to 5 percent of an anhydride plating modifier conforming to

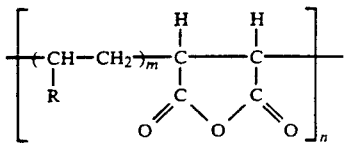

wherein R is hydrogen or a $C_{1-28}$ alkyl, aryl or alkylaryl radical, m is 1 to 3 and n is 1 to 200, said article being characterized in that it is at least partially coated with a metal layer deposited by an electroless plating process, with the proviso that said composition contains no conjugated diene and that said copolymer contains no basic nitrogen atoms.

2. The article of claim 1 wherein said R is a hydrogen atom or a $C_{14}-C_{16}$ alkyl group.

* * * * *